(12) United States Patent
Okunev

(10) Patent No.: US 7,787,568 B2
(45) Date of Patent: Aug. 31, 2010

(54) HIGH BIT RATE RFID SYSTEM

(75) Inventor: Yuri Okunev, Middle Island, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1101 days.

(21) Appl. No.: 11/472,453

(22) Filed: Jun. 22, 2006

(65) Prior Publication Data

US 2007/0297534 A1    Dec. 27, 2007

(51) Int. Cl.
*H03K 9/00* (2006.01)
(52) U.S. Cl. .............. 375/316; 375/261; 375/340; 375/320; 370/468; 370/343; 370/480
(58) Field of Classification Search ........... 375/316, 375/261, 340, 320; 370/468, 343, 480
See application file for complete search history.

(56) References Cited

U.S. PATENT DOCUMENTS

| | | | |
|---|---|---|---|
| 5,166,643 A | 11/1992 | Wilson et al. | |
| 5,642,384 A | 6/1997 | Ramesh | |
| 5,960,003 A * | 9/1999 | Fischer et al. | 370/468 |
| 5,995,019 A | 11/1999 | Chieu et al. | |
| 6,107,910 A | 8/2000 | Nysen | |
| 6,433,671 B1 | 8/2002 | Nysen | |
| 6,531,957 B1 | 3/2003 | Nysen | |
| 6,580,358 B1 | 6/2003 | Nysen | |
| 6,950,009 B1 | 9/2005 | Nysen | |
| 7,315,578 B2 * | 1/2008 | Cheng | 375/261 |
| 2003/0179830 A1 | 9/2003 | Eidson et al. | |
| 2007/0110191 A1 * | 5/2007 | Kim et al. | 375/340 |

OTHER PUBLICATIONS

Search Report and Written Opinion for International Application No. PCT/US07/13272 mailed Apr. 23, 2008, 13 pages.
Y. Okunev, "Phase and Phase-Difference Modulation in Digital Communications", Artech House, Boston-London, 1997, pp. 36-46 (Section 1.5).
EPCglobal, Inc., "Specification for RFID Air Interface—RFID Protocols, Class-1, Generation-2 UHF RFID FlexWorks Air interface Description", Version 1.0.9, Jan. 31, 2005, p. 32 (Section 6.3.1.3.3).

* cited by examiner

*Primary Examiner*—Eva Y Puente
(74) *Attorney, Agent, or Firm*—Glenn Frankenberger; Bartholomew J. DiVita; Terri S. Hughes

(57) ABSTRACT

Methods, systems, and apparatuses for quadrature amplitude modulation (QAM) based radio frequency identification (RFID) systems are described. In an aspect, a tag transmitter performs QAM signal mapping and quadrature modulation of a carrier wave (CW), to transmit a QAM response signal. In another aspect, a QAM-enabled reader receiver receives the QAM tag response signal, and performs quasi-coherent signal processing, based on tracking of QAM signal parameters in a decision feedback loop.

19 Claims, 11 Drawing Sheets

| Point index | Mapping Code 1 | Mapping Code 2 |
|---|---|---|
| 1 | 1100 (2,4,5,13) | 1111 |
| 2 | 1101 (1,3,16) | 1011 |
| 3 | 1111 (2,4) | 1010 |
| 4 | 1110 (1,3,6) | 1110 |
| 5 | 1000 (1,6,8,9) | 0111 |
| 6 | 1010 (4,5,7) | 0110 |
| 7 | 1011 (6,8) | 0010 |
| 8 | 1001 (5,7,10) | 0011 |
| 9 | 0000 (5,10,12,13) | 0101 |
| 10 | 0001 (8,9,11) | 0001 |
| 11 | 0011 (10,12) | 0000 |
| 12 | 0010 (9,11,14) | 0100 |
| 13 | 0100 (1,9,14,16) | 1101 |
| 14 | 0110 (12,13,15) | 1100 |
| 15 | 0111 (14,16) | 1000 |
| 16 | 0101 (2,13,15) | 1001 |

| 1 | 2 | 3 | 4 | 5 | 6 | 7 |
|---|---|---|---|---|---|---|
| Decision Index | Decision Amplitude | Decision $\sin \Delta$ | Decision $\cos \Delta$ | Current corrected reference signal $I_{ir}$ | Current corrected reference signal $Q_{ir}$ | Mapping Code |
| 1 | $\sqrt{2}$ | $-1/\sqrt{2}$ | $1/\sqrt{2}$ | $(I_i+Q_i)/2$ | $(Q_i - I_i)/2$ | 1100 |
| 2 | $\sqrt{10}$ | $-1/\sqrt{10}$ | $3/\sqrt{10}$ | $0.3I_i+0.1Q_i$ | $0.3Q_i - 0.1I_i$ | 1101 |
| 3 | $\sqrt{18}$ | $-1/\sqrt{2}$ | $1/\sqrt{2}$ | $(I_i+Q_i)/6$ | $(Q_i - I_i)/6$ | 1111 |
| 4 | $\sqrt{10}$ | $-3/\sqrt{10}$ | $1/\sqrt{10}$ | $0.1I_i+0.3Q_i$ | $0.1Q_i - 0.3I_i$ | 1110 |
| 5 | $\sqrt{2}$ | $-1/\sqrt{2}$ | $-1/\sqrt{2}$ | $(Q_i - I_i)/2$ | $-(I_i+Q_i)/2$ | 1000 |
| 6 | $\sqrt{10}$ | $-3/\sqrt{10}$ | $-1/\sqrt{10}$ | $0.3Q_i - 0.1I_i$ | $-0.3I_i-0.1Q_i$ | 1010 |
| 7 | $\sqrt{18}$ | $-1/\sqrt{2}$ | $-1/\sqrt{2}$ | $(Q_i - I_i)/6$ | $-(I_i+Q_i)/6$ | 1011 |
| 8 | $\sqrt{10}$ | $-1/\sqrt{10}$ | $-3/\sqrt{10}$ | $0.1Q_i - 0.3I_i$ | $-0.3Q_i - 0.1I_i$ | 1001 |
| 9 | $\sqrt{2}$ | $1/\sqrt{2}$ | $-1/\sqrt{2}$ | $-(Q_i + I_i)/2$ | $(I_i - Q_i)/2$ | 0000 |
| 10 | $\sqrt{10}$ | $1/\sqrt{10}$ | $-3/\sqrt{10}$ | $-0.1Q_i - 0.3I_i$ | $0.1I_i - 0.3Q_i$ | 0001 |
| 11 | $\sqrt{18}$ | $1/\sqrt{2}$ | $-1/\sqrt{2}$ | $-(Q_i + I_i)/6$ | $(I_i - Q_i)/6$ | 0011 |
| 12 | $\sqrt{10}$ | $3/\sqrt{10}$ | $-1/\sqrt{10}$ | $-0.1 I_i - 0.3Q_i$ | $0.3 I_i - 0.1Q_i$ | 0010 |
| 13 | $\sqrt{2}$ | $1/\sqrt{2}$ | $1/\sqrt{2}$ | $(I_i - Q_i)/2$ | $(I_i + Q_i)/2$ | 0100 |
| 14 | $\sqrt{10}$ | $3/\sqrt{10}$ | $1/\sqrt{10}$ | $0.1 I_i - 0.3Q_i$ | $0.3 I_i + 0.1Q_i$ | 0110 |
| 15 | $\sqrt{18}$ | $1/\sqrt{2}$ | $1/\sqrt{2}$ | $(I_i - Q_i)/6$ | $(I_i + Q_i)/6$ | 0111 |
| 16 | $\sqrt{10}$ | $1/\sqrt{10}$ | $3/\sqrt{10}$ | $0.3 I_i - 0.1Q_i$ | $0.1 I_i + 0.3Q_i$ | 0101 |

FIG. 12

| 1 | 2 | 3 |
|---|---|---|
| Index of constellation point n | Corrected constellation point $I_{cn}$ | Corrected constellation point $Q_{cn}$ |
| 1 | $Ir - Qr$ | $Ir + Qr$ |
| 2 | $3Ir - Qr$ | $Ir + 3Qr$ |
| 3 | $3(Ir - Qr)$ | $3(Qr + Ir)$ |
| 4 | $Ir - 3Qr$ | $Qr + 3Ir$ |
| 5 | $-Ir - Qr$ | $Ir - Qr$ |
| 6 | $-3Qr - Ir$ | $3Ir - Qr$ |
| 7 | $-3(Ir + Qr)$ | $3(Ir - Qr)$ |
| 8 | $-Qr - 3Ir$ | $Ir - 3Qr$ |
| 9 | $-I_{c1}$ | $-Q_{c1}$ |
| 10 | $-I_{c2}$ | $-Q_{c2}$ |
| 11 | $-I_{c3}$ | $-Q_{c3}$ |
| 12 | $-I_{c4}$ | $-Q_{c4}$ |
| 13 | $-I_{c5}$ | $-Q_{c5}$ |
| 14 | $-I_{c6}$ | $-Q_{c6}$ |
| 15 | $-I_{c7}$ | $-Q_{c7}$ |
| 16 | $-I_{c8}$ | $-Q_{c8}$ |

FIG. 13

HIGH BIT RATE RFID SYSTEM

BACKGROUND OF THE INVENTION

1. Field of the Invention

The present invention relates to wireless communications, and more particularly, to radio frequency identification (RFID) communication systems including RFID readers that communicate with RFID tags.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored wirelessly by devices known as "readers." Readers typically have one or more antennas transmitting radio frequency signals to which tags respond. Since the reader "interrogates" RFID tags, and receives signals back from the tags in response to the interrogation, the reader is sometimes termed as "reader interrogator" or simply "interrogator".

With the maturation of RFID technology, efficient communications between tags and interrogators has become a key enabler in supply chain management, especially in manufacturing, shipping, and retail industries, as well as in building security installations, healthcare facilities, libraries, airports, warehouses etc.

In a RFID system, typically an interrogator transmits a continuous wave (CW) or modulated radio frequency (RF) signal to a tag. The tag receives the signal, and responds by modulating the signal, "backscattering" an information signal to the interrogator. The interrogator receives signals back from the tag, and the signals are demodulated, decoded and further processed.

A recent RFID standard specifies communication parameters for a 2nd generation of RFID systems, known as "Gen 2 RFID systems" with extended data transmission capabilities, including different modulation and encoding techniques, and a wide spectrum of bit rates. The high speed transmission of data according to Gen 2 requires more sophisticated signal processing procedures which provide high performance in terms of bit error rate (BER) and block error rate (BLER), in as simple an implementation of both tags and readers as possible.

Advanced RFID systems need considerable increase in their data rates. The Gen 2 RFID specification is designed to provide a high bit rate. However, Gen 2 RFID systems have limited ability for data rate improvement because they utilize binary signals. This "two-position" limitation is caused by specific problems of tag implementation. Improvements in data rate are possible based on the utilization of multi-position signals. Some advanced research and development is in progress in this area. Multi-amplitude-phase mapping techniques, such as QAM (Quadrature Amplitude Modulation), are being researched for future RFID systems. Such RFID systems, if successful, could provide a higher bit rates than existing binary RFID systems at the same frequency bandwidth. However, limitations on tag and interrogator complexity prevent utilization of QAM signal processing in present RFID systems.

Thus, what is needed are ways of integrating multi-position signal technology into RFID systems to provide higher bit rates.

BRIEF SUMMARY OF THE INVENTION

Methods, systems, and apparatuses for QAM based RFID systems are described. Embodiments of these RFID systems provide considerable improvement in data rates between readers and tags. In an aspect, a tag transmitter performs QAM signal mapping and quadrature modulation of a carrier wave (CW) received from a reader. In another aspect, a QAM reader receiver performs quasi-coherent signal processing, based on tracking of QAM signal parameters in a decision feedback loop.

In a first aspect, a method in a radio frequency identification (RFID) tag for communicating with a RFID reader is described. A first plurality of data bits is stored. A plurality of N data bits of the first plurality of data bits is mapped into a point of an M-QAM constellation of points, where $M=2^N$, and where the point is defined by an I coordinate and a Q coordinate. A quadrature modulated radio frequency signal is generated based on the I coordinate, the Q coordinate, and a radio frequency signal. The quadrature modulated radio frequency signal is radiated from the tag.

In another aspect, a radio frequency identification (RFID) tag is described. The tag includes an antenna, a memory, a mapper, and a quadrature modulator. The antenna receives a radio frequency signal from a reader. The memory stores a first plurality of data bits. The mapper receives a plurality of N data bits of the first plurality of data bits. The mapper maps the plurality of N data bits into a point of an M-QAM constellation of points, where $M=N^2$, and where the point is defined by an I coordinate and a Q coordinate. The quadrature modulator generates a quadrature modulated radio frequency signal based on the I and Q coordinates and the received radio frequency signal. The antenna radiates the quadrature modulated radio frequency signal.

In another aspect, a method in a radio frequency identification (RFID) reader of communicating with RFID tags is described. A received quadrature modulated radio frequency signal is demodulated to an in-phase signal component and a quadrature-phase signal component that contain a current data symbol. A closest point of M previously generated corrected constellation points to the demodulated in-phase and quadrature-phase signal components is determined. The determined closest point is demapped to a data value for the current data symbol. A corrected in-phase reference signal and a corrected quadrature-phase reference signal are generated based on the data value for the current data symbol (current decision), the in-phase signal component, and the quadrature-phase signal component. An averaged corrected in-phase reference signal and an averaged corrected quadrature-phase reference signal are generated based on corrected in-phase reference signals and corrected quadrature-phase reference signals generated for S data symbols including the current data symbol. A corrected constellation having M corrected constellation points is generated based on the averaged corrected in-phase reference signal and the averaged corrected quadrature-phase reference signal.

In still another aspect, a radio frequency identification (RFID) reader is described. The reader includes a demodulator, a decision module, a demapper module, a corrected reference signal generator, an average signal generator, and a corrected constellation points generator. The demodulator demodulates a received quadrature modulated radio frequency signal to an in-phase signal component and a quadrature-phase signal component that contain a current data symbol. The decision module determines a closest point of M previously generated corrected constellation points to the in-phase and the quadrature-phase signal components. The demapper module demaps the determined closest point to a data value for the current data symbol. The corrected reference signal generator receives the data value for the current data symbol (current decision), the in-phase signal component, and the quadrature-phase signal component, and generates a corrected in-phase reference signal and a corrected quadrature-phase reference signal. The average signal generator receives corrected in-phase reference signals and corrected quadrature-phase reference signals generated for each of S data symbols including the current data symbol, and generates an averaged corrected in-phase reference signal and an averaged corrected quadrature-phase reference signal. The corrected constellation points generator receives the averaged corrected in-phase reference signal and the averaged corrected quadrature-phase reference signal, and generates a current corrected constellation having M current corrected constellation points.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 12 shows a table providing information for generating a corrected reference signal, according to an example embodiment of the present invention.

FIG. 13 shows a table providing information for generating a corrected 16-QAM constellation, according to an example embodiment of the present invention.

Figure 1:
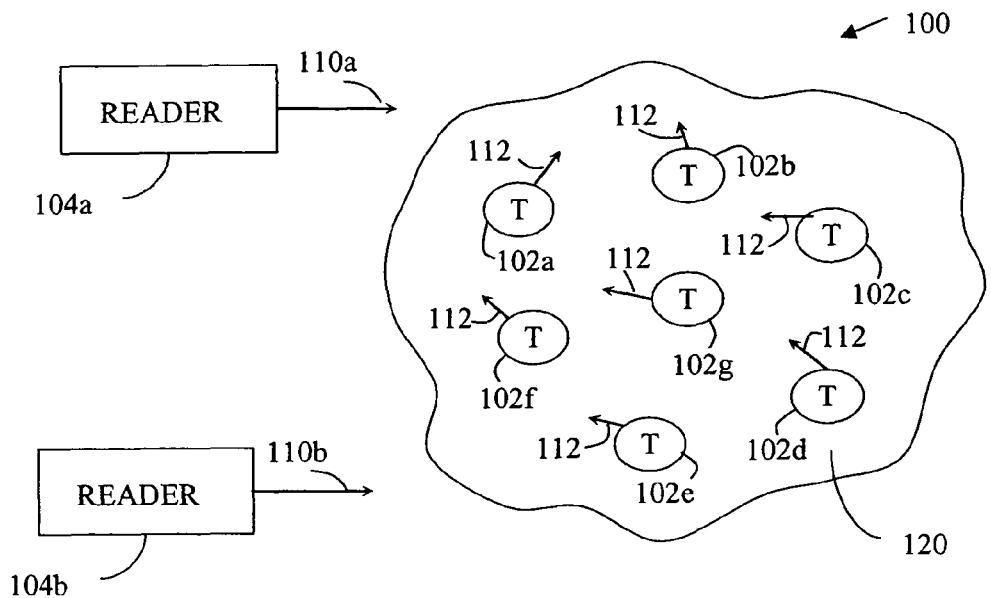
FIG. 1 shows an environment where RFID readers communicate with an exemplary population of RFID tags.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner. Likewise, particular bit values of "0" or "1" (and representative voltage values) are used in illustrative examples provided herein to represent data for purposes of illustration only. Data described herein can be represented by either bit value (and by alternative voltage values), and embodiments described herein can be configured to operate on either bit value (and any representative voltage value), as would be understood by persons skilled in the relevant art(s).

Example RFID System Embodiment

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network.

As shown in FIG. 1, reader 104a transmits an interrogation signal 110 having a carrier frequency to the population of tags 120. Reader 104b transmits an interrogation signal 110b having a carrier frequency to the population of tags 120. Readers 104a and 104b typically operate in one or more of the frequency bands allotted for this type of RF communication. For example, frequency bands of 902-928 MHz and 2400-2483.5 MHz have been defined for certain RFID applications by the Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred to herein as backscatter modulation. Readers 104a and 104b receive and obtain data from response signals 112, such as an identification number of the responding tag 102. In the embodiments described herein, a reader may be capable of communicating with tags 102 according to any suitable communication protocol, including Class 0, Class 1, EPC Gen 2, other binary traversal protocols and slotted aloha protocols, any other protocols mentioned elsewhere herein, and future communication protocols.

Figure 2:
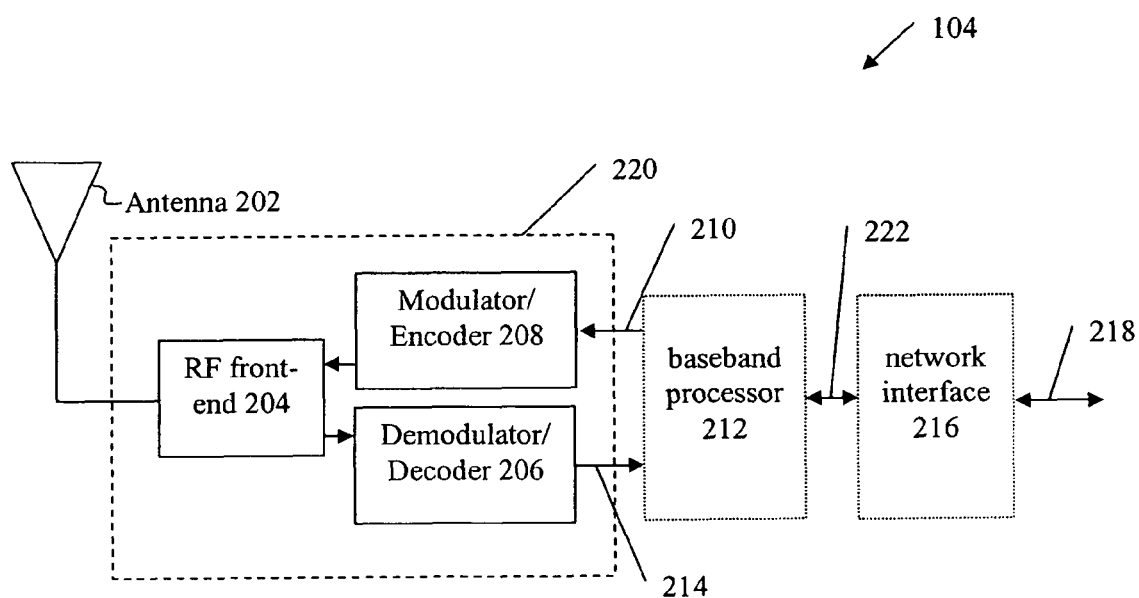
FIG. 2 shows a block diagram of receiver and transmitter portions of an RFID reader.

FIG. 2 shows a block diagram of an example RFID reader 104. Reader 104 includes one or more antennas 202, a receiver and transmitter portion 220 (also referred to as transceiver 220), a baseband processor 212, and a network interface 216. These components of reader 104 may include software, hardware, and/or firmware, or any combination thereof, for performing their functions.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Reader 104 has at least one antenna 202 for communicating with tags 102 and/or other readers 104. Antenna(s) 202 may be any type of reader antenna known to persons skilled in the relevant art(s), including a vertical, dipole, loop, Yagi-Uda, slot, or patch antenna type. For description of an example antenna suitable for reader 104, refer to U.S. Ser. No. 11/265,143, filed Nov. 3, 2005, titled "Low Return Loss Rugged RFID Antenna," now pending, which is incorporated by reference herein in its entirety.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation request 210, and is coupled to an input of RF front-end 204. Modulator/encoder 208 encodes interrogation request 210 into a signal format, modulates the encoded signal, and outputs the modulated encoded interrogation signal to RF front-end 204. For example, pulse-interval encoding (PIE) may be used in a Gen 2 embodiment. Furthermore, double sideband amplitude shift keying (DSB-ASK), single sideband amplitude shift keying (SSB-ASK), or phase-reversal amplitude shift keying (PR-ASK) modulation schemes may be used in a Gen 2 embodiment. Note that in an embodiment, baseband processor 212 may alternatively perform the encoding function of modulator/encoder 208.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214.

Note that in an embodiment, baseband processor 212 may alternatively perform the decoding function of demodulator/decoder 206.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as would be known to persons skilled in the relevant art(s).

Figure 3:
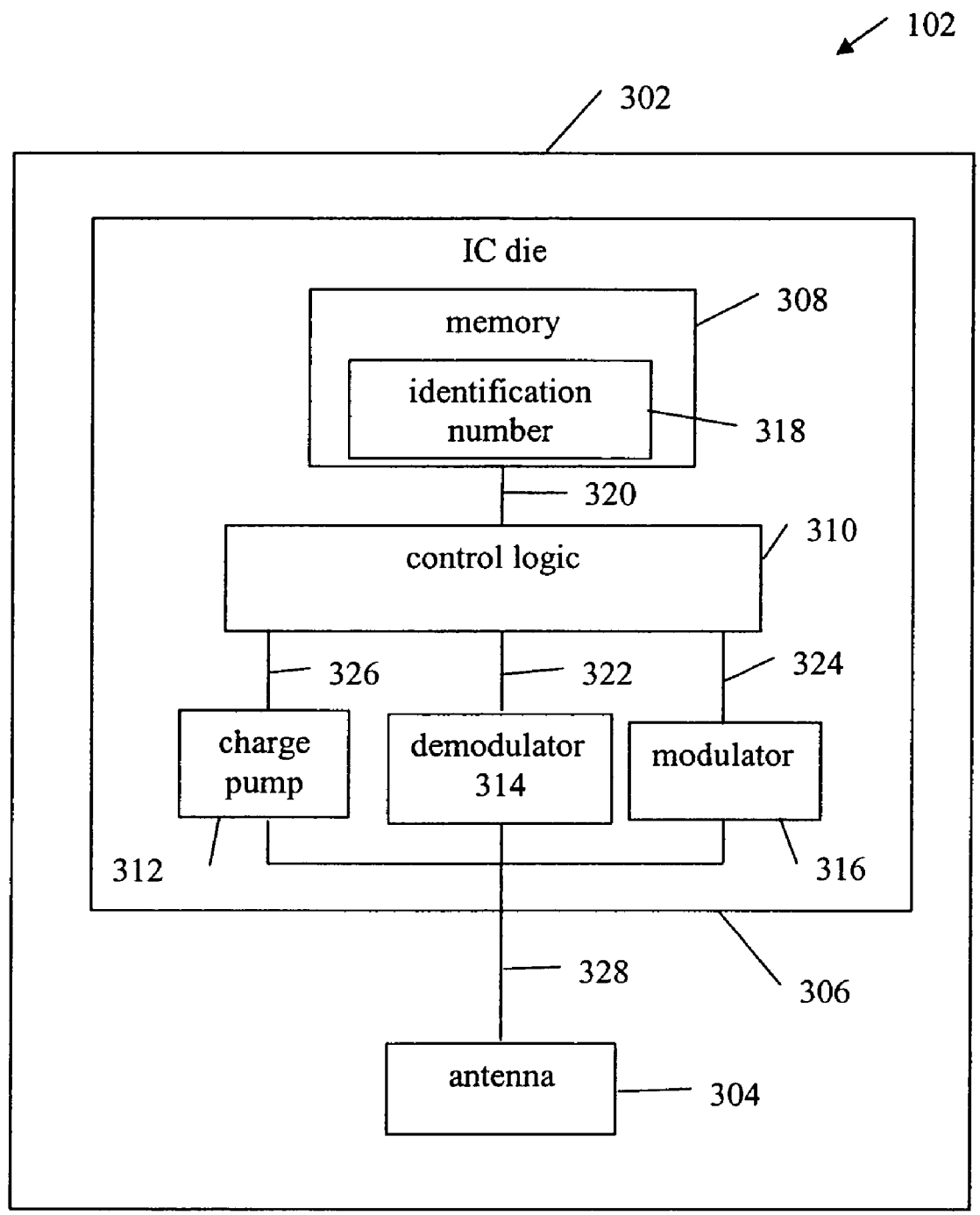
FIG. 3 shows a block diagram of an example radio frequency identification (RFID) tag.

The present invention is applicable to any type of RFID tag. FIG. 3 shows a plan view of an example radio frequency identification (RFID) tag 102. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including dipole, loop, slot, or patch antenna type. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304. In the example embodiment of FIG. 3, IC 306 includes a memory 308, a control logic 310, a charge pump 312, a demodulator 314, and a modulator 316. An input of charge pump 312, an input of demodulator 314, and an output of modulator 316 are coupled to antenna 304 by antenna signal 328. Note that in the present disclosure, the terms "lead" and "signal" may be used interchangeably to denote the connection between elements or the signal flowing on that connection.

Memory 308 is typically a non-volatile memory, but can alternatively be a volatile memory, such as a DRAM. Memory 308 stores data, including an identification number 318. Identification number 318 typically is a unique identifier (at least in a local environment) for tag 102. For instance, when tag 102 is interrogated by a reader (e.g., receives interrogation signal 110 shown in FIG. 1), tag 102 may respond with identification number 318 to identify itself. Identification number 318 may be used by a computer system to associate tag 102 with its particular associated object/item.

Demodulator 314 is coupled to antenna 304 by antenna signal 328. Demodulator 314 demodulates a radio frequency communication signal (e.g., interrogation signal 110) on antenna signal 328 received from a reader by antenna 304. Control logic 310 receives demodulated data of the radio frequency communication signal from demodulator 314 on input signal 322. Control logic 310 controls the operation of RFID tag 102, based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112, which is received by reader 104. In an embodiment, modulator 316 includes a switch, such as a single pole, single throw (SPST) switch. The switch changes the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art(s).

Charge pump 312 is coupled to antenna 304 by antenna signal 328. Charge pump 312 receives a radio frequency communication signal (e.g., a carrier signal transmitted by reader 104) from antenna 304, and generates a direct current (DC) voltage level that is output on a tag power signal 326. Tag power signal 326 is used to power circuits of IC die 306, including control logic 320.

In an embodiment, charge pump 312 rectifies the radio frequency communication signal of antenna signal 328 to create a voltage level. Furthermore, charge pump 312 increases the created voltage level to a level sufficient to power circuits of IC die 306. Charge pump 312 may also include a regulator to stabilize the voltage of tag power signal 326. Charge pump 312 may be configured in any suitable way known to persons skilled in the relevant art(s). For description of an example charge pump applicable to tag 102, refer to U.S. Pat. No. 6,734,797, titled "Identification Tag Utilizing Charge Pumps for Voltage Supply Generation and Data Recovery," which is incorporated by reference herein in its entirety. Alternative circuits for generating power in a tag are also applicable to embodiments of the present invention. Further description of charge pump 312 is provided below.

It will be recognized by persons skilled in the relevant art(s) that tag 102 may include any number of modulators, demodulators, charge pumps, and antennas. Tag 102 may additionally include further elements, including an impedance matching network and/or other circuitry. Embodiments of the present invention may be implemented in tag 102, and in other types of tags.

Example embodiments of the present invention are described in further detail below. Such embodiments may be implemented in the environments, readers, and tags described above, and/or in alternative environments and alternative RFID devices.

EXAMPLE EMBODIMENTS

Methods, systems, and apparatuses for QAM-based RFID systems are described. In an embodiment, a tag transmitter performs QAM signal mapping and quadrature modulation of a carrier wave (CW) received from a reader. In another embodiment, a QAM reader receiver performs quasi-coherent signal processing, based on tracking of QAM signal parameters. These embodiments can be implemented in any types of RFID tags, including those described above and otherwise known.

The example embodiments described herein are provided for illustrative purposes, and are not limiting. The examples described herein may be adapted to any type of tag and reader. Further structural and operational embodiments, including modifications/alterations, will become apparent to persons skilled in the relevant art(s) from the teachings herein.

Quadrature amplitude modulation (QAM) is a modulation scheme in which two sinusoidal carrier waves, one 90 degrees out of phase with respect to the other, are used to transmit data over a communications channel. The two carrier waves are summed and transmitted as a single carrier wave. Because the orthogonal carrier waves occupy the same frequency band and differ by a 90 degree phase shift, each can be modulated independently, transmitted over the same frequency band, and separated by demodulation performed at the receiver. For a given available bandwidth, QAM enables data transmission at twice the rate of standard pulse amplitude modulation (PAM) without degradation in the bit error rate (BER).

"16-QAM" is achieved by modulating two 4-level PAM signals onto orthogonal carrier signals. Thus, in 16-QAM, each of the orthogonal carrier signals carry two bits of information, for a total of 4 bits carried in a particular 16-QAM data symbol.

Figure 4:
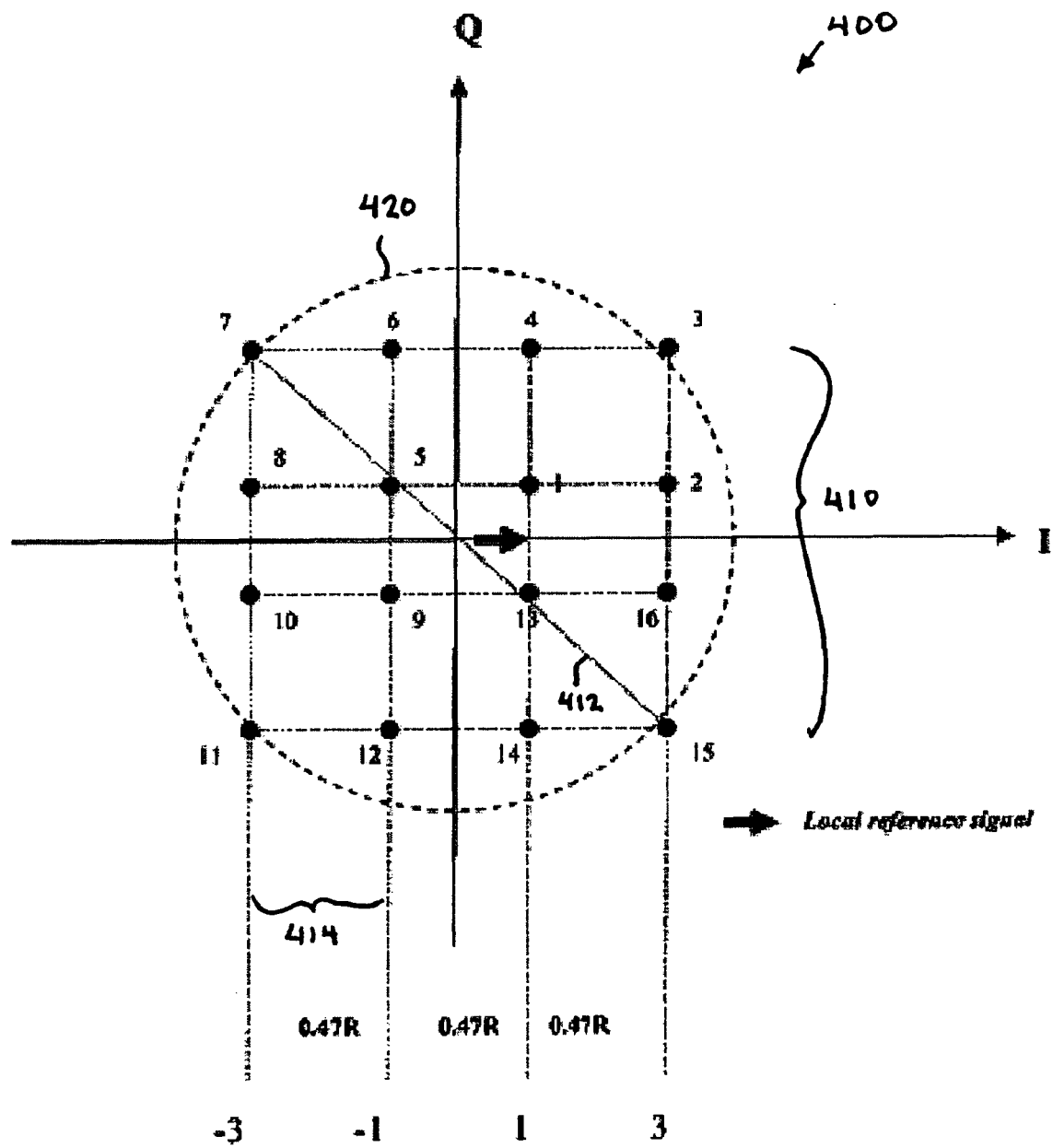
FIG. 4 shows a 16-QAM constellation formed of nodes in a square array, according to an example embodiment of the present invention.

In QAM, constellation diagrams having constellation points may be used to represent signals. 16-QAM has a constellation of 16 points. For example, FIG. 4 shows an example 16-QAM constellation 400. The constellation points may be arranged in a square grid with equal vertical and horizontal spacing, although other configurations are possible, as would be understood by persons skilled in the relevant art(s). Because data is usually binary, the number of points in the grid is usually a power of 2. Because QAM is usually "square," common forms of QAM include 16-QAM, 64-QAM (a 64 point constellation, 6 bits per data symbol), and 256-QAM (a 256 point constellation, 8 bits per data symbol). By moving to a higher-order constellation, it is possible to transmit more bits per symbol The embodiments described below are described in terms of a 16-QAM communications system for illustrative purposes. The embodiments described herein are adaptable to other QAM implementations, including 64-QAM, 128-QAM, etc., and/or to alternative constellation configurations, as would be understood by persons skilled in the relevant art(s).

As shown in FIG. 4, 16-QAM constellation 400 is described by 16 pairs of numbers of the 16 constellation points in 2-dimensional space, numbered 1-16. Each point is defined by a pair of coordinates (real and imaginary components)—Icn and Qcn, where n=1-16. Icn and Qcn are also called quadrature components of the received base-band QAM signal, the "in-phase quadrature component" and "quadrature-phase component" of the received baseband QAM signal, respectively.

16-QAM constellation 400 is located in nodes of a square array 410 in FIG. 4. A size of array 410 is defined by the diagonal of a large square of array 410, which is equal to a diameter 412 (2R=2 times a radius) of a circumscribed circle 420. The maximum power of constellation points is proportional to $R^2$. Four points at the corners of constellation 400, having indexes 3, 7, 11, and 15, achieve the maximum power level.

A minimum distance Dmin (e.g., distance 414 shown in FIG. 4) between points of 16-QAM constellation 400 is equal to:

$$Dmin=\sqrt{2}\times R/3 \approx 0.47R$$

Taking into account that an optimal 16-ary QAM constellation configuration has a minimum distance of about 0.48R, 16-QAM constellation 400 close to optimal. The square array 410 of constellation 400 provides high noise immunity in an Additive White Gaussian Noise (AWGN) channel among all possible 16-ary QAM constellations with limited pick power.

Figure 5:
FIG. 5 shows a table providing example mapping codes, according to embodiments of the present invention.

FIG. 5 shows a table 500 listing two example mapping codes for constellation 400. Column 502 of table 500 lists indexed constellation points (1-16) of constellation 400. Column 504 of table 500 lists a first mapping code, including a mapped code for each constellation point listed column 502.

Column 506 of table 500 lists a second mapping code, including a mapped code for each constellation point listed column 502. A mapping code is a correspondence between constellation points and binary combinations to be transmitted as QAM symbols. Mapping codes of table 500 satisfy a requirement for an optimal mapping code, namely: any two code words corresponding to two constellation points having the minimum distance (e.g., distance 414) between them, differ by only one digit. Due to this attribute of these mapping codes, if a reader receiver makes a wrong decision (as further described below) in favor of an incorrect constellation point adjacent to a correct constellation point, only one of four bits of the mapped code will be erroneous. Note that for illustrative purposes, column 504 lists indexes (in parenthesis) of all points located at the minimum distance from the particular point of a row.

Note that although two mapping codes (columns 504 and 506) are shown for illustrative purposes in FIG. 5, further mapping codes may exist for 16-QAM (and for alternative QAM configurations). Embodiments of the present invention are applicable to these further mapping codes.

Figure 6:
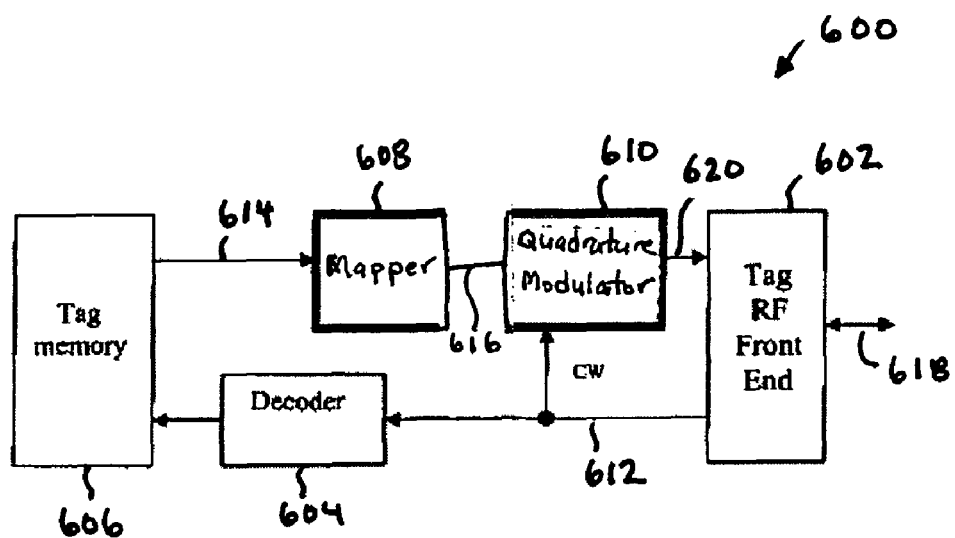
FIG. 6 shows a block diagram of a tag transceiver, according to an example embodiment of the present invention.

FIG. 6 shows a block-diagram of a tag transceiver 600, according to an example embodiment of the present invention. Tag transceiver 600 may be present in an RFID tag, such as the tag types described above or otherwise known. Tag transceiver 600 includes a RF front end 602, a decoder 604, a memory 606, a QAM Mapper 608, and a quadrature modulator 610.

RF front end 602 includes at least an antenna (e.g., antenna 304 shown in FIG. 3), and receives a communications signal 612 from a reader. Received signal 612 is processed by decoder 604 (e.g., demodulator 304 and/or control logic 310 shown in FIG. 3), providing preamble processing, synchronization and data decoding. If data received in received signal 612 contains a command requesting the tag of transceiver 600 to transmit information (e.g., an identification number, sensor data, other data, etc.), a sequence of bits 614 corresponding to the information is fed to QAM mapper 608 from memory 606 (e.g., memory 308 shown in FIG. 3).

QAM mapper 608 receives a plurality of N data bits of sequence of bits 614, and maps the plurality of N data bits into a point of an M-QAM constellation of points, where $M=2^N$. In a 16-QAM embodiment (M=16), QAM mapper 608 transforms sequence of bits 614 into 4-digit blocks (N=4), and each block is mapped into one of 16 points of the 16-QAM constellation. This mapping procedure transforms each 4-bit binary combination into levels and signs of two values I and Q 616, which are coordinates of a constellation point in the 2-dimensional space. In a 16-QAM embodiment, the values I and Q 616 are a pair of numbers from the permitted set of numbers −3, −1, +1, +3 (see FIG. 4).

Quadrature modulator 610 modulates the values I and Q 616 onto quadrature components of a carrier signal, to generate a quadrature modulated carrier signal 620. In a passive tag, the unmodulated carrier wave received from the reader is used as the carrier signal. Quadrature modulated carrier signal 620 is received by RF front end 602. RF front end 602 radiates quadrature modulated carrier signal 618 from an antenna.

Figure 7:
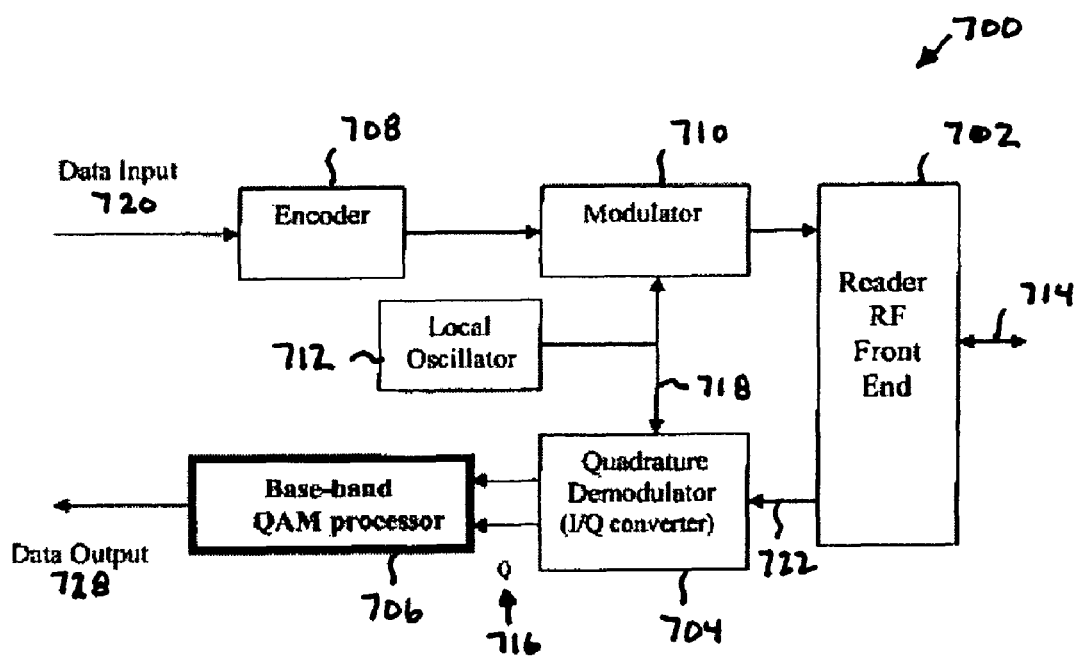
FIG. 7 shows a block diagram of a reader transceiver, according to an example embodiment of the present invention.

FIG. 7 shows a reader transceiver 700, according to an example embodiment of the present invention. Reader transceiver 700 provides efficient quasi-coherent signal processing, based on the tracking of QAM signal parameters. Reader transceiver 700 includes a RF front end 702, a quadrature demodulator 704, a baseband QAM processor 706, an encoder 708, a modulator 710, and a local oscillator 712.

RF front end 702 (e.g., RF front end 204 shown in FIG. 2) includes an antenna (e.g., antenna 202 shown in FIG. 2), amplifying, and matching elements. RF front end 702 receives a quadrature modulated radio frequency signal 714 (e.g., quadrature modulated carrier signal 618 of FIG. 6) from a tag. Quadrature demodulator 704 receives a quadrature modulated signal 722 from RF front end 702. Quadrature modulated signal 722 is transformed into I and Q components 716 by quadrature demodulator 704 based on a reference signal 718 received from local oscillator 712. I and Q components 716 are fed to baseband QAM processor 706, which provides for preamble detection, synchronization, tracking, and decoding of the received data signal. Finally, baseband QAM processor 706 transforms, according to a demapping procedure, each constellation point of I and Q components 716 into a data combination (e.g., 4 bits in a 16-QAM embodiment), and outputs the data as data output signal 728 for further processing and utilization.

Encoder 708 and modulator 710 (e.g., modulator/encoder 208 shown in FIG. 2) receive input data 720, and process input data 720 in a conventional manner. RF front end 702 transmits a modulated signal generated by modulator 710.

Example 16-QAM embodiments for tag transceiver 600 and reader transceiver 700 are described below.

Example 16-QAM Tag Transmitter Embodiment

An advantage of a 16-QAM constellation is a relatively simple mapping (encoding) algorithm, which may be realized in a tag transmitter. In a 16-QAM example embodiment described as follows, the quadrature components are generated separately, and are both equal to one of 4 discrete positions: +1, −1, +3, or −3. In alternative 16-QAM embodiments, the discrete positions could be differently located in the constellation.

Figure 8:
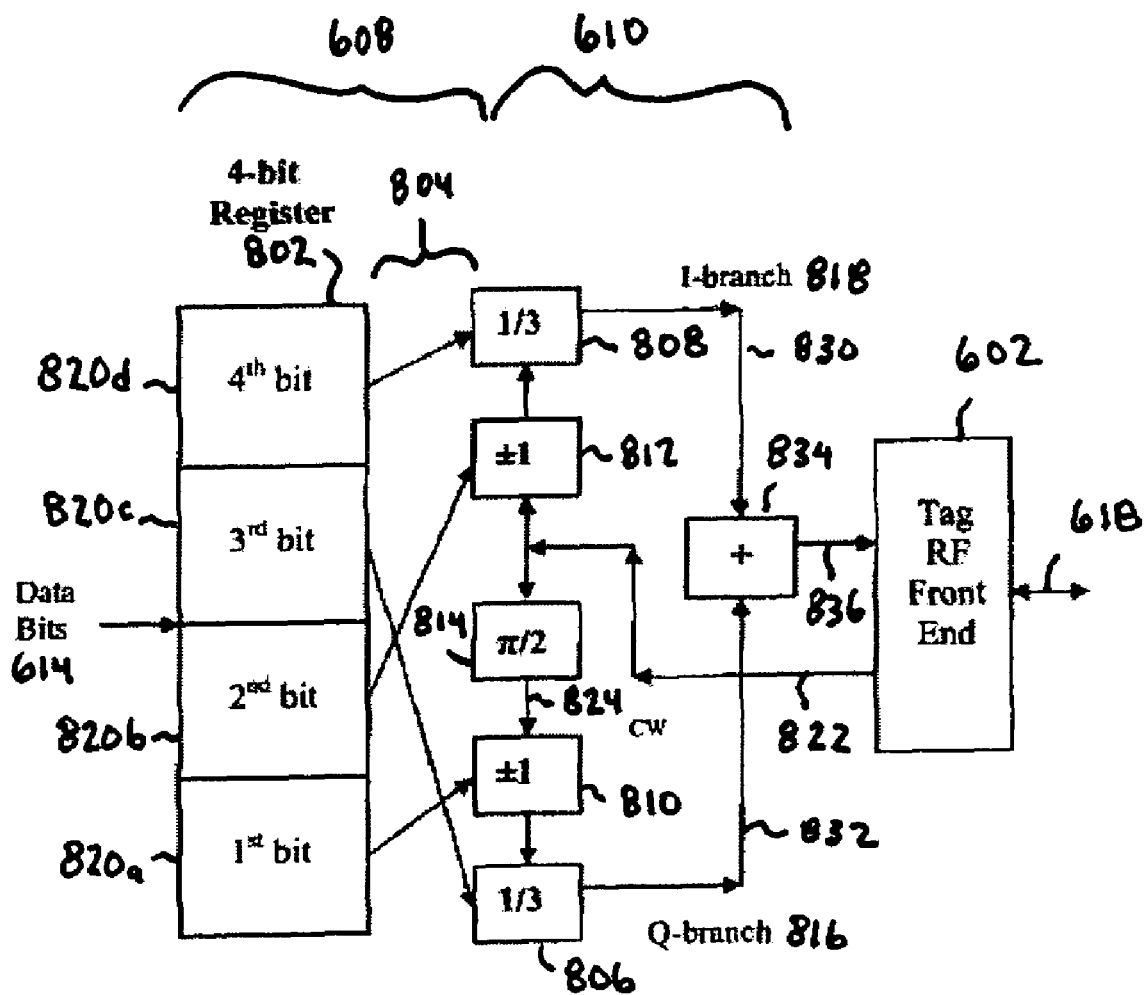
FIG. 8 shows a block diagram of a 16-QAM tag transmitter, according to an example embodiment of the present invention.

FIG. 8 shows a block diagram of a 16-QAM tag transmitter system 800, according to an example embodiment of the present invention. Transmitter system 800 includes QAM mapper 608 and quadrature modulator 610 configured in a 16-QAM configuration. QAM mapper 608 includes a 4-bit register 802, and a plurality of interconnections 804 between outputs of register 802 and control inputs quadrature modulator 610. Quadrature modulator 610 include first and second controlled attenuators 806 and 808, first and second controlled inverters 810 and 812, and a 90 degree phase shifter 814.

Figure 9A:
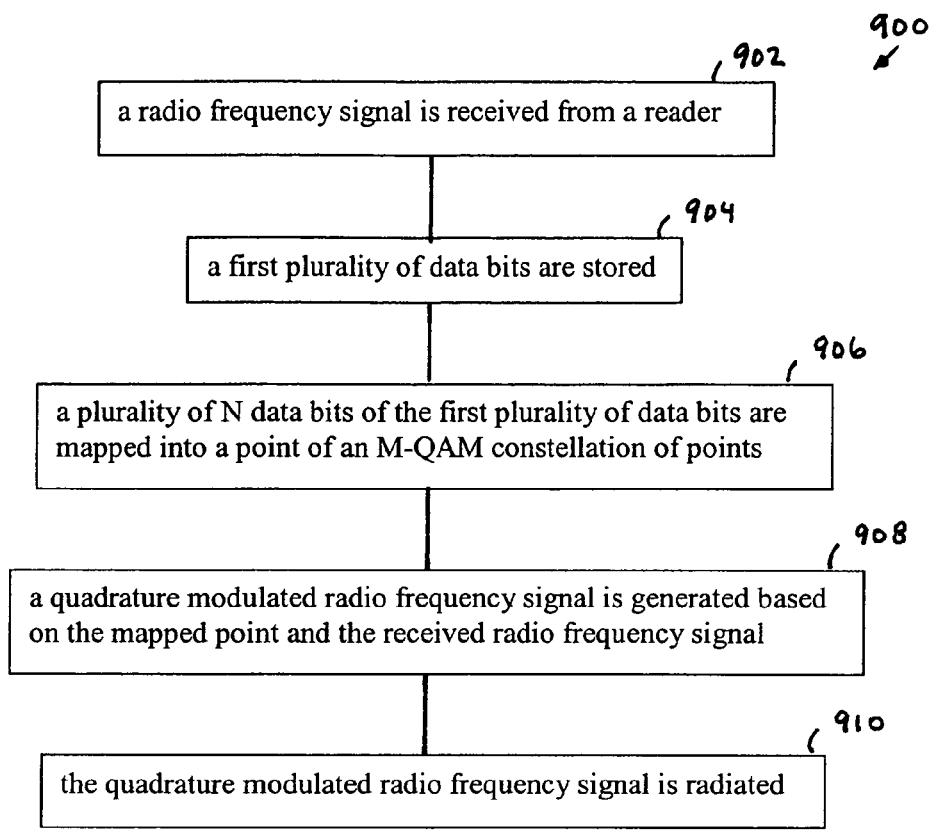
FIGS. 9A and 9B show flowcharts for transmitting a QAM communication signal, according to example embodiments of the present invention.

FIG. 8 is described below with reference to FIGS. 9A and 9B. FIG. 9A shows flowchart 900 providing example steps for transmitting a QAM modulated response signal from a tag, according to an example embodiment of the present invention. Other structural and operational embodiments will be apparent to persons skilled in the relevant art(s) based on the following discussion. The steps shown in FIG. 9A do not necessarily have to occur in the order shown. The steps of FIG. 9A are described in detail below. Note that the signals described below may be analog or digital.

Flowchart 900 begins with step 902. In step 902, a radio frequency signal is received from a reader. For example, the radio frequency signal may be a carrier wave transmitted by a reader.

In step 904, a first plurality of data bits are stored. For example, the first plurality of bits may be an identification number for a tag, such as identification number 318 stored in memory 308 as shown in FIG. 3, sensor data, other tag-related data, etc.

In step 906, a plurality of N data bits of the first plurality of data bits are mapped into a point of an M-QAM constellation of points. Note that in an embodiment, $M=2^N$, and the point is defined by an I coordinate and a Q coordinate. For example, in a 16-QAM embodiment, the N data bits are four data bits of the first plurality of data bits. In the example of FIG. 8, a sequence of data bits 614 are combined into 4-bit combinations and received by 4-bit register 802. Each 4-bit combination may be written into register 802 in any manner, such as sequentially or in parallel. Register 802 may be implemented in hardware, software, firmware, or any combination thereof. For example, register 802 may be implemented as a real hardware saving unit and/or a virtual software unit, to provide for distribution of binary elements of the 4-bit combination among the inputs of quadrature modulator 610.

In an embodiment, an index of the M-QAM constellation points is selected to represent the data for transmission. For example, in a 16-QAM embodiment, if the 4 bits are 1011, and the mapping code of column 504 of FIG. 5 used, an index of 7 is selected from column 502 to represent the data during transmission. Thus, constellation point of 7 shown in FIG. 4 is mapped for transmission (i.e., I=−3, Q=3).

Interconnections 804 between register 802 and quadrature modulator 610 are configured according to the mapping code. For illustrative purposes, interconnections 804 in FIG. 8 are configured according to the first mapping code, shown in column 504 of table 500 of FIG. 5. However, interconnections 804 may be configured in other ways, depending on the particular mapping code.

In step 908, a quadrature modulated radio frequency signal is generated based on the mapped point and the received radio frequency signal. For example, the quadrature modulated radio frequency signal is quadrature modulated signal 836.

90 degree phase shifter 814 receives a carrier signal 822 from RF front end 618, and shifts carrier wave 816 by 90 degrees to create a quadrature carrier signal 818. In an embodiment carrier signal 822 is a radio frequency signal received from a reader. However, in an alternative embodiment, carrier signal 822 is generated by tag transmitter system 800.

Figure 9B:
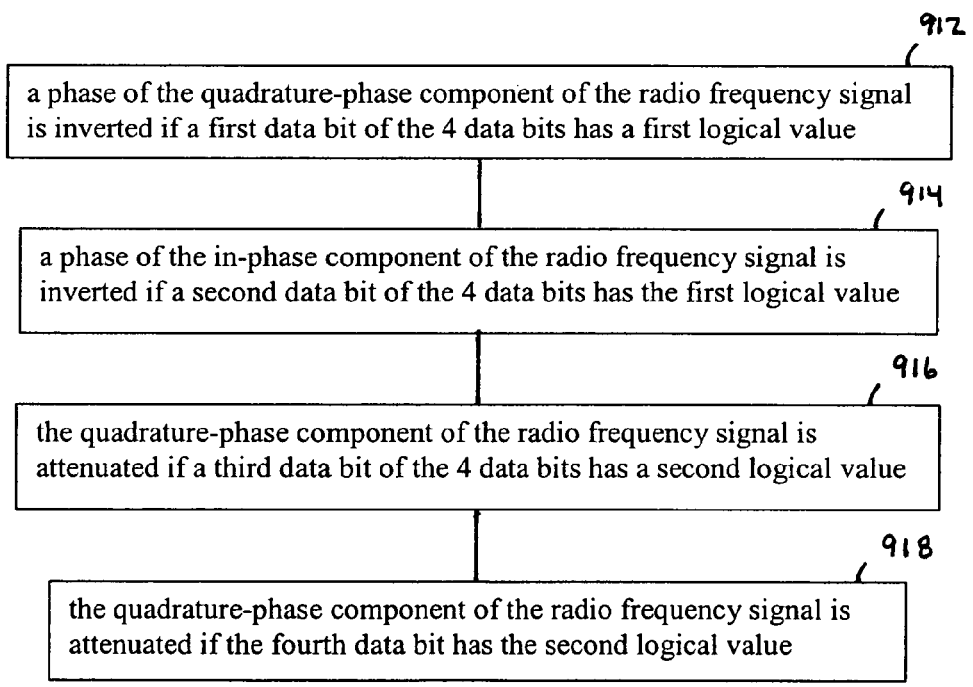

FIG. 9B shows example steps for performing step 908, according to an example embodiment of the present invention. Other structural and operational embodiments will be apparent to persons skilled in the relevant art(s) based on the following discussion. The steps shown in FIG. 9B do not necessarily have to occur in the order shown.

In step 912, a phase of the quadrature-phase component of the radio frequency signal is inverted if a first data bit of the 4 data bits has a first logical value. For example, as shown in FIG. 8, a first bit 820a stored in register 802 is coupled by interconnections 804 to first inverter 810 in a Q-branch 816 of quadrature modulator 610. First bit 820a controls a state of first inverter 810. First inverter 810 is configured to invert a phase of quadrature carrier signal 824 if first bit 820a is a "0" logical value, and to not invert the phase of quadrature carrier signal 824 if first bit 820a is a "1" logical value.

In step 914, a phase of the in-phase component of the radio frequency signal is inverted if a second data bit of the 4 data bits has the first logical value. For example, a second bit 820b stored in register 802 is coupled by interconnections 804 to second inverter 812 in an I-branch 818 of quadrature modulator 610. Second bit 820b controls a state of second inverter 812. Second inverter 812 is configured to invert a phase of carrier signal 822 if second bit 820b is a "0" logical value, and to not invert the phase of carrier signal 822 if second bit 820b is a "1" logical value.

In step 916, the quadrature-phase component of the radio frequency signal is attenuated if a third data bit of the 4 data bits has a second logical value. For example, a third bit 820c stored in register 802 is coupled by interconnections 804 to first attenuator 806 in Q-branch 816. Third bit 820c controls a state of first attenuator 806. First attenuator 806 is configured to attenuate quadrature carrier signal 824 if third bit 820c is a "0" logical value, and to not attenuate quadrature carrier signal 824 if third bit 820c is a "1" logical value. In the embodiment of FIG. 8, when attenuating, first attenuator 806 attenuates quadrature carrier signal 824 by a factor of 3.

In step 918, the quadrature-phase component of the radio frequency signal is attenuated if the fourth data bit has the second logical value. For example, a fourth bit 820c stored in register 802 is coupled by interconnections 804 to second attenuator 808 in I-branch 818. Fourth bit 820d controls a state of second attenuator 808. Second attenuator 808 is configured to attenuate carrier signal 822 if fourth bit 820d is a "0" logical value, and to not attenuate carrier signal 822 if fourth bit 820d is a "1" logical value. In the embodiment of FIG. 8, when attenuating, second attenuator 808 attenuates carrier signal 822 by a factor of 3.

In Q-branch 816 of quadrature modulator 610, quadrature carrier signal 824 is received by first inverter 810 and inverted if dictated by first bit 820a (e.g., multiplied by +1 or −1), and is received by first attenuator 806 and attenuated if dictated by second bit 820b. In I-branch 818 of quadrature modulator 610, carrier signal 822 is received by second inverter 812 and inverted if dictated by second bit 820b (e.g., multiplied by +1 or −1), and is received by second attenuator 808 and attenuated if dictated by fourth bit 820d.

For example, if the 4 data bits are 1011 and thus index 7 point of the 16-QAM constellation of FIG. 4 is selected for transmission (according to column 504 of FIG. 5), register 802 stores: bit 820a=1, bit 820b=0, bit 820c=1, and bit 820d=1. Thus, in such situation, first inverter 810 does not invert the phase of quadrature carrier signal 824, second inverter 812 inverts the phase of carrier signal 822, first attenuator 806 does not attenuate quadrature carrier signal 824, and second attenuator 808 does not attenuate carrier signal 822, to transmit constellation point index 7.

Thus, an in-phase pulse amplitude modulated (PAM) signal 830 is output by I-branch 818, and a quadrature-phase PAM signal 832 is output by Q-branch 816, which are summed by summer 834. Summer 834 outputs quadrature modulated signal 836, which is a QAM modulated signal.

In step 910, the quadrature modulated radio frequency signal is radiated. For example, as shown in FIG. 8, quadrature modulated radio frequency signal 836 is radiated by an antenna of RF front end 602 as quadrature modulated carrier signal 618.

Example 16-QAM Reader Receiver Embodiment

An example reader receiver embodiment is described in this section, that is based on coherent signal processing, and provides considerable energy gain compared to non-coherent signal processing in the case of multi-position QAM modulation. The coherent signal processing is based on carrier recovery (a phase and amplitude adjustment procedure), including an initial phase and amplitude estimation during the preamble, and phase and amplitude tracking during data transmission.

The initial phase and amplitude estimation may be performed by measuring quadrature components of a reference signal, transmitted during the preamble. These procedures, sometimes referred to as "signal equalization," are not described in detail herein, as it is assumed that initialization of reference quadrature components is accomplished during preamble processing before data transmission.

Figure 10:
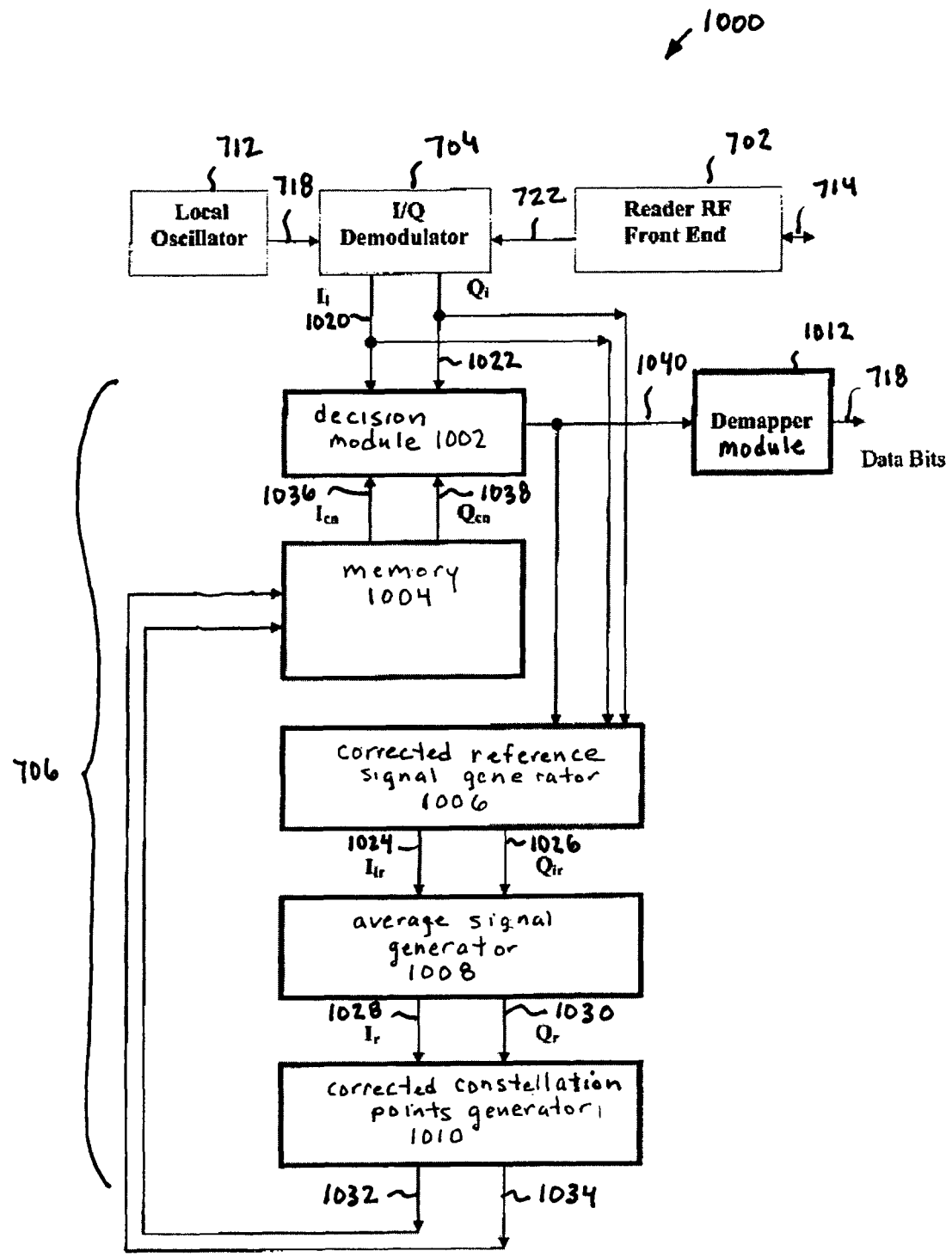
FIG. 10 shows a block diagram of a QAM receiver in a reader, according to an example embodiment of the present invention.

FIG. 10 shows a block diagram of a 16-QAM reader receiver system 1000, according to an example embodiment of the present invention. System 1000 includes local oscillator 712, quadrature demodulator 704, RF front end 702, a decision module 1002, a memory 1004, a corrected reference signal generator 1006, an average signal generator 1008, a corrected constellation points generator 1010, and a demapper module 1012. Decision module 1002, corrected reference signal generator 1006, average signal generator 1008, corrected constellation points generator 1010, and demapper module 1012 form an embodiment of baseband QAM processor 706 shown in FIG. 7. Note that baseband QAM processor 706 can be implemented in hardware, software, firmware, or any combination thereof.

Figure 11:
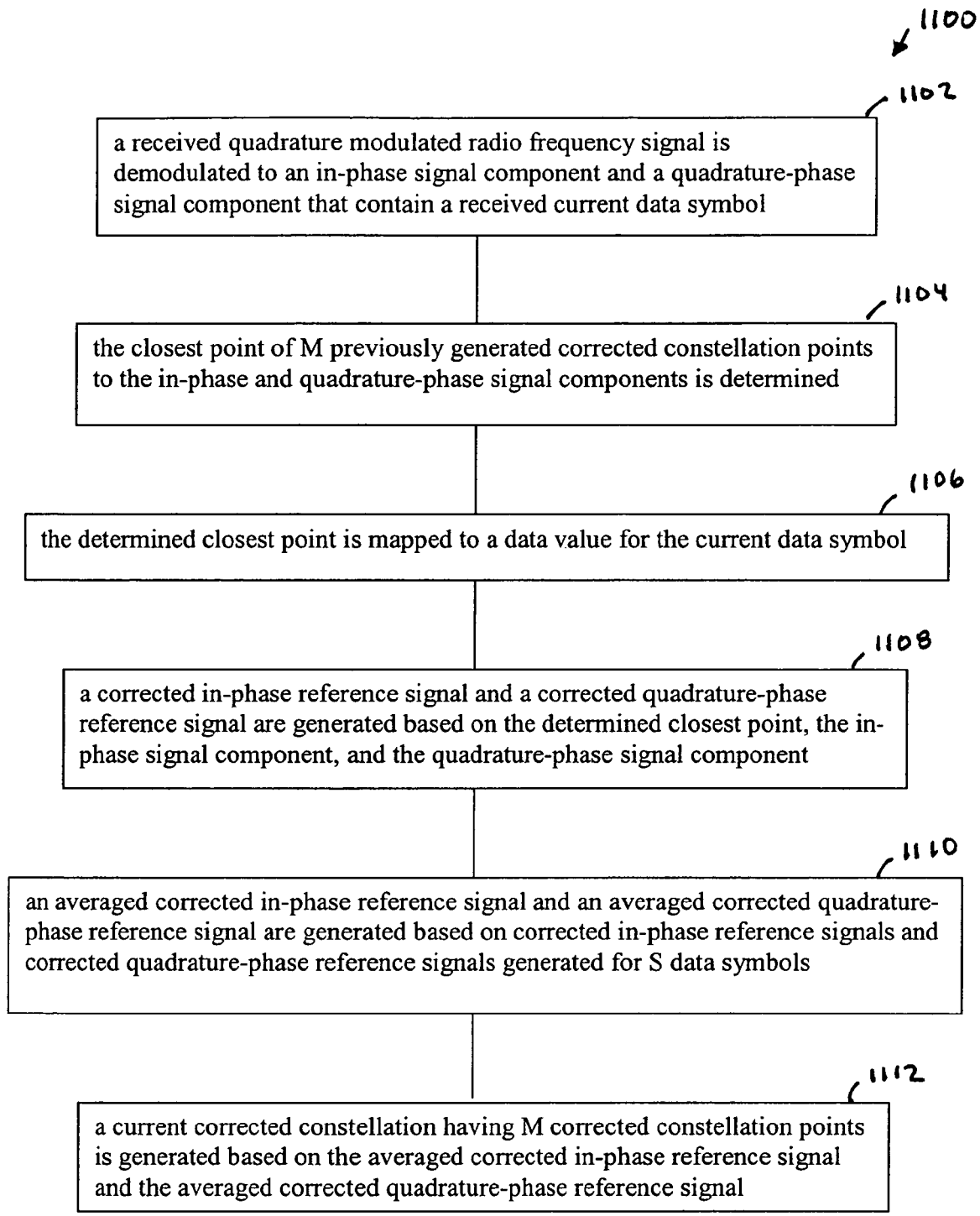
FIG. 11 shows a flowchart for receiving a QAM communication signal, according to an example embodiment of the present invention.

FIG. 10 is described with reference to a flowchart 1100 shown in FIG. 11. FIG. 11 shows flowchart 1100 providing example steps for receiving a QAM modulated response signal from a tag, according to an example embodiment of the present invention. Other structural and operational embodiments will be apparent to persons skilled in the relevant art(s) based on the following discussion. The steps shown in FIG. 11 do not necessarily have to occur in the order shown. The steps of FIG. 11 are described in detail below. Note that the signals described below may be analog or digital, depending on the particular implementation of baseband QAM processor 706.

Flowchart 1100 begins with step 1102. In step 1102, a received quadrature modulated radio frequency signal is demodulated to an in-phase signal component and a quadrature-phase signal component that contain a received (mapped) current data symbol. For example, step 1102 may be performed by demodulator 704. As shown in FIG. 10, demodulator 704 receives reference signal 718 from local oscillator 712, and quadrature modulated signal 722, and generates an in-phase signal component 1020 and a quadrature-phase signal component 1022. Together, in-phase signal component 1020 and a quadrature-phase signal component 1022 contain a current data symbol that is to be recovered.

It is noted that in-phase signal component 1020 (Ii) and quadrature-phase signal component 1022 (Qi) are received by decision module 1002. Furthermore, memory 1004 stores one or more previously generated constellation points that are input to decision module 1002, as further described below. Decision module 1002 makes a decision regarding the current data symbol based on its inputs, as further described below, which in a 16-QAM embodiment is a number from 1 to 16. At a beginning of operation of system 700 (e.g., after preamble detection), decision module 1002 may use initial constellation coordinates based on preamble initialization.

In step 1104, the closest point of M previously generated corrected constellation points to the current data symbol is determined. For example, step 1104 may be performed by decision module 1002. As shown in FIG. 10, decision module 1002 receives an in-phase corrected constellation signal 1036 (Icn) and a quadrature-phase corrected constellation signal 1038 (Qcn) from memory 1004. In-phase corrected constellation signal 1036 includes the I-coordinates of M previously generated corrected constellation points stored in memory 1004. Quadrature-phase corrected constellation signal 1038 includes the Q-coordinates of M previously generated corrected constellation points stored in memory 1004. Decision module 1002 determines the closest point of the M previously generated constellation points received in in-phase corrected constellation signal 1036 and quadrature-phase corrected constellation signal 1038 to the current data symbol. Decision module 1002 outputs a decision signal 1040.

In step 1106, the determined closest point is mapped to a data value for the current data symbol. For example, step 1106 may be performed by demapper module 1012. As shown in FIG. 10, demapper module 1012 receives decision signal 1040, and demaps the determined closest point in decision signal 1040 to a data value for the current data symbol. For example, decision signal 1040 may include an index (e.g., a number in the range of 1-16 in a 16-QAM embodiment) of the closed constellation point of the M current constellation points of memory 1004. This index is transformed into a data bit combination according to a utilized mapping code. For example, if the first mapping code of column 504 of FIG. 5 is used, the index of the closed point (column 502) is mapped to the corresponding data combination in column 504. For instance, if the determined closest point is 7, index 7 in column 502 maps to a data value of 1011 in column 504.

In step 1108, a corrected in-phase reference signal and a corrected quadrature-phase reference signal are generated based on the determined closest point, the in-phase signal component, and the quadrature-phase signal component. For example, step 1108 may be performed by corrected reference signal generator 1006. As shown in FIG. 10, corrected reference signal generator 1006 receives decision signal 1040, in-phase signal component 1020, and quadrature-phase signal component 1022. Corrected reference signal generator 1006 generates a corrected in-phase reference signal 1024 and a corrected quadrature-phase reference signal 1026. Examples of generating corrected in-phase and quadrature-phase reference signals 1024 and 1026 are described below.

In step 1110, an averaged corrected in-phase reference signal and an averaged corrected quadrature-phase reference signal are generated based on corrected in-phase reference signals and corrected quadrature-phase reference signals generated for S data symbols including the current data symbol. For example, step 1110 may be performed by average signal generator 1008. Average signal generator 1008 receives a corrected in-phase reference signal and a corrected quadrature-phase reference signal generated for each of S data symbols, including the current data symbol (e.g., as generated in step 1108). Average signal generator 1008 generates an averaged corrected in-phase reference signal 1028 and an averaged corrected quadrature-phase reference signal 1030. Examples of generating averaged corrected in-phase and quadrature-phase reference signals 1028 and 1030 are described below.

In step 1112, a current corrected constellation having M corrected constellation points is generated based on the averaged corrected in-phase reference signal and the averaged corrected quadrature-phase reference signal. Each of the M corrected constellation points is defined by an I coordinate and a Q coordinate. For example, step 1108 may be performed by corrected constellation points generator 1010. As shown in FIG. 10, corrected constellation points generator 1010 receives averaged corrected in-phase reference signal 1028 and averaged corrected quadrature-phase reference signal 1030. Corrected constellation points generator 1010 generates a corrected constellation having M corrected constellation points, wherein each of the M corrected constellation points is defined by an I coordinate and a Q coordinate. The corrected constellation is output from corrected constellation points generator 1010 as in-phase corrected constellation signal 1032 and quadrature-phase corrected constellation signal 1034. In an embodiment, the I and Q coordinates of in-phase corrected constellation signal 1032 and quadrature-phase corrected constellation signal 1034 may be stored in a memory 1004. Examples of generating in-phase and quadrature-phase corrected constellation signals 1032 and 1034 are described below.

Memory 1004 receives and stores in-phase and quadrature-phase corrected constellation signals 1032 and 1034. The stored in-phase and quadrature-phase corrected constellation signals 1032 and 1034 may be used by decision module 1002 to generate decision signal 1040 for subsequently received data symbols.

In an embodiment, corrected reference signal generator 1006 may perform step 1108 as described below. Referring to FIG. 7, local oscillator (LO) 712 generates a local reference signal 718 for quadrature demodulator 704. Local reference signal 718 can be identified with any vector in the constellation space shown in FIG. 4. However, for algorithm simplification, and for illustrative purposes, a vector 430 shown in FIG. 4, with coordinates I=1 and Q=0, is used below. However, it would be understood by persons skilled in the relevant art(s) that other vectors could be used for local reference signal 718, including a vector having coordinates I=0 and Q=1, or other vectors.

For local reference signal 718, using vector 430 having I, Q coordinates (1,0), components of the current corrected reference signal Iir and Qir at the i-th received symbol may be calculated by corrected reference signal generator 1006 as follows:

Corrected in-phase reference signal 1024 may be generated according to:

$$I_r = A_0(I\cos\Delta - Q\sin\Delta)/A, \text{ and} \qquad \text{Equation 1A}$$

corrected quadrature-phase reference signal 1026 may be generated according to:

$$Q_r = A_0(Q\cos\Delta + I\sin\Delta)/A; \qquad \text{Equation 1B}$$

wherein:

I=in-phase signal component 1020,

Q=quadrature-phase signal component 1022, $I_r$=the corrected in-phase reference signal for the current data symbol, $Q_r$=the corrected quadrature-phase reference signal for the current data symbol, Δ=a phase difference between the local reference signal and a vector formed by the current decision of decision signal 1040 (the determined closest point), A=an amplitude of the vector formed by the current decision, and A0=an amplitude of the local reference signal.

FIG. 12 shows a table 1200 that contains calculations for the I and Q coordinates of the current corrected reference signal for 16-QAM constellation 400 of FIG. 4, using the first mapping code of column 504 shown in FIG. 5, and a local reference signal 712 having a vector I=1, Q=0. Thus, in an embodiment, calculations of table 1200 can be used to perform step 1108 of FIG. 11.

A first column 1202 of table 1200 lists current decisions (e.g., in decision signal 1040), which are indexes of points in the 16-QAM constellation 400 of FIG. 4.

A second column 1204 of table 1200 lists amplitudes of the current decision.

A third column 1206 of table 1200 lists a sine function of a phase difference Δ between the current decision and the local reference signal.

A fourth column 1208 of table 1200 lists a cosine function of a phase difference Δ between the current decision and the local reference signal.

A fifth column 1210 of table 1200 lists an I-coordinate of the current corrected reference signal.

A sixth column 1212 of table 1200 lists a Q-coordinate of the current corrected reference signal.

A seventh column 1214 of table 1200 lists a data code, corresponding to the decisions in first column 1202.

As shown in Table 1200 the I/Q components of the current corrected reference signal (corrected in-phase reference signal 1024 and corrected quadrature-phase reference signal 1026) are equal to linear combinations of the I/Q components of the received signal (in-phase signal component 1020 and quadrature-phase signal component 1022). Fifth column 1210 shows calculations for generating corrected in-phase reference signal 1024, and sixth column 1212 shows calculations for generating corrected quadrature-phase reference signal 1026.

For instance, in an example, assuming that decision signal 1040 includes a decision index of 7, corrected in-phase reference signal 1024 and corrected quadrature-phase reference signal 1026 can be calculated according to columns 1210 and 1212 of table 1200, as follows:

corrected in-phase reference signal 1024=$(Q-I)/6$ corrected quadrature-phase reference signal 1026=$-(I+Q)/6$ where:

I=in-phase signal component 1020, and
Q=quadrature-phase signal component 1022.

In an embodiment, average signal generator 1008 may perform step 1110 as described below. For a given sequence of S symbols (received by 16-QAM reader receiver system 1000), defined by indexes j from (i-N) to i, averaged corrected in-phase reference signal 1028 can be generated according to:

$$I_r(i) = \left(\frac{1}{S}\right) \sum_{j=i-S}^{i} I_{jr}; \text{ and} \qquad \text{Equation 2A}$$

averaged corrected quadrature-phase reference signal 1030 can be generated according to:

$$Q_r(i) = \left(\frac{1}{S}\right) \sum_{j=i-S}^{i} Q_{jr}; \qquad \text{Equation 2B}$$

wherein:

i=an index of the current data symbol,
j=an index of data symbols, where j<i for data symbols prior to the current data symbol, and j=i for the current data symbol,
$I_{jr}$=the corrected in-phase reference signal for the jth data symbol,
$Q_{jr}$=the corrected quadrature-phase reference signal for the jth data symbol,
$I_r(i)$=averaged corrected in-phase reference signal 1028, and
$Q_r(i)$=averaged corrected quadrature-phase reference signal 1030.

Note that averaging may be performed in various ways. In an embodiment, a sliding window average may performed. In this case the estimates Ir(i) and Qr(i) are calculated for each symbol by averaging S preceding symbols. This approach provides a more accurate phase correction, but requires considerable processing resources and memory.

In another embodiment, averaging is performed by averaging a block of S symbols. In this case the estimates Ir(i) and Qr(i) are calculated for each block of S symbols, on a block by block basis, and phase correction is provided once per S-symbol block. This approach requires relatively less memory and fewer processing resources.

It should be also noted that if all decisions being averaged according to Equations 2A and 2B are correct, then Equations 2A and 2B provide an optimal estimate, such that the estimate is unbiased and effective in terms of minimum variance.

Values Ir(i) and Qr(i) from Equations 2A and 2B are estimates of I/Q components of the corrected reference signal. They can be used as the basis for carrier phase and amplitude tracking.

Equations 2A and 2B describe rotation of real signals caused by channel parameter variation. Based on the estimates provided by Equations 2A and 2B, coordinates Icn and Qcn of the corrected constellation points can be calculated. In an embodiment, corrected constellation points generator 1010 may perform step 1108 as described according to an algorithm listed in FIG. 13. FIG. 13 shows a table 1300 providing a calculation procedure for calculation of each coordinate Icn and Qcn of the corrected constellation points of QAM constellation 400 of FIG. 4 using the averaged corrected reference signal (averaged corrected in-phase reference signal 1028 (Ir) and averaged corrected quadrature-phase reference signal 1030 (Qr)).

In a 16-QAM embodiment, the decision made by decision module 1002 is an index of one of 16 constellation points. This index uniquely relates to the 4-bit binary combination transmitted by the tag (e.g., by tag transceiver 600). In an embodiment, decision module 1002 may perform step 1104 as described below. Decision module 1002 determines an index of the corrected constellation point (Icn,Qcn), which is the closest one (has minimum distance) to the received signal (Ii, Qi). In an embodiment, decision module 1002 performs step 1110 by calculating M distance values according to:

distance value $(n) = [(I-I_{cn})^2 + (Q-Q_{cn})^2]$ wherein:

n=1 through M,
I=the in-phase signal component,
Q=the quadrature-phase signal component,
$I_{cn}$=an I coordinate of a corrected constellation point n, and
$Q_{cn}$=a Q coordinate of a corrected constellation point n.

Thus, in an embodiment, decision module 1002 determines the closest point to be a point n corresponding to the determined minimum distance value (n) of the calculated M distance values.

Example Computer System Embodiments

In this document, the terms "computer program medium" and "computer usable medium" are used to generally refer to media such as a removable storage unit, a hard disk installed in hard disk drive, and signals (i.e., electronic, electromagnetic, optical, or other types of signals capable of being received by a communications interface). These computer program products are means for providing software to a computer system. The invention, in an embodiment, is directed to such computer program products.

In an embodiment where aspects of the present invention are implemented using software, the software may be stored in a computer program product and loaded into a computer system using a removable storage drive, hard drive, or communications interface. The control logic (software), when executed by a processor, causes the processor to perform the functions of the invention as described herein.

According to an example embodiment, a reader may execute computer-readable instructions to process a QAM signal received from a tag as described above. Furthermore, in an embodiment, a tag may execute computer-readable instructions to perform the above described mapping and/or modulating functions, as further described elsewhere herein.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A radio frequency identification (RFID) reader, comprising:
   a demodulator configured to demodulate a received quadrature modulated radio frequency signal to an in-phase signal component and a quadrature-phase signal component that contain a current data symbol;
   a decision module configured to determine a closest point of M previously generated corrected constellation points to the in-phase signal component and the quadrature-phase signal component;
   a demapper module configured to demap the determined closest point to a data value for the current data symbol;
   a corrected reference signal generator configured to receive the determined closest point, the in-phase signal component, and the quadrature-phase signal component, and to generate a corrected in-phase reference signal and a corrected quadrature-phase reference signal;
   an average signal generator configured to receive corrected in-phase reference signals and corrected quadrature-phase reference signals generated for each of S data symbols including the current data symbol, and to generate an averaged corrected in-phase reference signal and an averaged corrected quadrature-phase reference signal; and
   a corrected constellation points generator configured to receive the averaged corrected in-phase reference signal and the averaged corrected quadrature-phase reference signal, and to generate a current corrected constellation having M current corrected constellation points, wherein each of the M current corrected constellation points is defined by an I coordinate and a Q coordinate.

2. The RFID reader of claim 1, wherein the data value has N bits, where $M=2^N$.

3. The RFID reader of claim 1, wherein the corrected reference signal generator is configured to generate the corrected in-phase reference signal according to:

$$I_r = A_0(I \cos \Delta - Q \sin \Delta)/A;$$

and the corrected reference signal generator is configured to generate the corrected quadrature-phase reference signal according to:

$$Q_r = A_0(Q \cos \Delta + I \sin \Delta)/A;$$

wherein:
   I=the in-phase signal component,
   Q=the quadrature-phase signal component,
   $I_r$=the corrected in-phase reference signal for the current data symbol,
   $Q_r$=the corrected quadrature-phase reference signal for the current data symbol,
   Δ=a phase difference between the local reference signal and a vector formed by the determined closest point,
   A=an amplitude of the vector, and
   $A_0$=an amplitude of the local reference signal.

4. The RFID reader of claim 3, wherein the average signal generator is configured generate the averaged corrected in-phase reference signal according to:

$$I_r(i) = \left(\frac{1}{S}\right)\sum_{j=i-S}^{i} I_{jr};$$

and the average signal generator is configured generate the averaged corrected quadrature-phase reference signal according to:

$$Q_r(i) = \left(\frac{1}{S}\right)\sum_{j=i-S}^{i} Q_{jr};$$

wherein:
   i=an index of the current data symbol,
   j=an index of data symbols, where j<i for data symbols prior to the current data symbol, and j=i for the current data symbol,
   $I_{jr}$=the corrected in-phase reference signal for the jth data symbol,
   $Q_{jr}$=the corrected quadrature-phase reference signal for the jth data symbol,
   $I_r(i)$=the averaged corrected in-phase reference signal for the current data symbol, and
   $Q_r(i)$=the averaged corrected quadrature-phase reference signal for the current data symbol.

5. The RFID reader of claim 1, wherein the average signal generator is configured as a sliding window average generator.

6. The RFID reader of claim 1, wherein the average signal generator is configured to generate the averaged corrected in-phase reference signal and the averaged corrected quadrature-phase reference signal for each received block of S data symbols.

7. The RFID reader of claim 1, wherein M=16, wherein the corrected reference signal generator is configured generate the corrected in-phase reference signal ($I_{ir}$) and the corrected quadrature-phase reference signal ($Q_{ir}$), according to:

| | | |
|---|---|---|
| if i = 1, | $I_{1r} = (I + Q)/2$, and | $Q_{1r} = (Q - I)/2$, |
| if i = 2, | $I_{2r} = 0.3I + 0.1Q$, and | $Q_{2r} = 0.3Q - 0.1I$, |
| if i = 3, | $I_{3r} = (I + Q)/6$, and | $Q_{3r} = (Q - I)/6$, |
| if i = 4, | $I_{4r} = 0.1I + 0.3Q$, and | $Q_{4r} = 0.1Q - 0.3I$, |
| if i = 5, | $I_{5r} = (Q - I)/2$, and | $Q_{5r} = -(I + Q)/2$, |
| if i = 6, | $I_{6r} = 0.3Q - 0.1I$, and | $Q_{6r} = -0.3I - 0.1Q$, |
| if i = 7, | $I_{7r} = (Q - I)/6$, and | $Q_{7r} = -(I + Q)/6$, |
| if i = 8, | $I_{8r} = 0.1Q - 0.3I$, and | $Q_{8r} = -0.3Q - 0.1I$, |
| if i = 9, | $I_{9r} = -(I + Q)/2$, and | $Q_{9r} = (I - Q)/2$, |
| if i = 10, | $I_{10r} = -0.3I - 0.1Q$, and | $Q_{10r} = -0.3Q + 0.1I$, |
| if i = 11, | $I_{11r} = -(I + Q)/6$, and | $Q_{11r} = (I - Q)/6$, |

-continued

| | | |
|---|---|---|
| if i = 12, | $I_{12r} = -0.1I - 0.3Q$, and | $Q_{12r} = -0.1Q + 0.3I$, |
| if i = 13, | $I_{13r} = (I - Q)/2$, and | $Q_{13r} = (I + Q)/2$, |
| if i = 14, | $I_{14r} = -0.3Q + 0.1I$, and | $Q_{14r} = 0.3I + 0.1Q$, |
| if i = 15, | $I_{15r} = (I - Q)/6$, and | $Q_{15r} = (I + Q)/6$, and |
| if i = 16, | $I_{16r} = -0.1Q + 0.3I$, and | $Q_{16r} = 0.3Q + 0.1I$, | wherein:
i=an index of the data value for the current data symbol,
I=the in-phase signal component, and
Q=the quadrature-phase signal component.

8. The RFID reader of claim 1, wherein M=16, wherein the corrected constellation points generator is configured to generate 16 corrected constellation points ($I_{c1}$-$I_{c16}$) according to:

| | |
|---|---|
| $I_{c1} = Ir - Qr$, | $Q_{c1} = Ir + Qr$, |
| $I_{c2} = 3Ir - Qr$, | $Q_{c2} = Ir + 3Qr$, |
| $I_{c3} = 3(Ir - Qr)$, | $Q_{c3} = 3(Ir + Qr)$, |
| $I_{c4} = Ir - 3Qr$, | $Q_{c4} = 3Ir + Qr$, |
| $I_{c5} = -Ir - Qr$, | $Q_{c5} = Ir - Qr$, |
| $I_{c6} = -Ir - 3Qr$, | $Q_{c6} = 3Ir - Qr$, |
| $I_{c7} = -3(Ir + Qr)$, | $Q_{c7} = 3(Ir - Qr)$, |
| $I_{c8} = -3Ir - Qr$, | $Q_{c8} = Ir - 3Qr$, |
| $I_{c9} = -I_{c1}$, | $Q_{c9} = -Q_{c1}$, |
| $I_{c10} = -I_{c2}$, | $Q_{c10} = -Q_{c2}$, |
| $I_{c11} = -I_{c3}$, | $Q_{c11} = -Q_{c3}$, |
| $I_{c12} = -I_{c4}$, | $Q_{c12} = -Q_{c4}$, |
| $I_{c13} = -I_{c5}$, | $Q_{c13} = -Q_{c5}$, |
| $I_{c14} = -I_{c6}$, | $Q_{c14} = -Q_{c6}$, |
| $I_{c15} = -I_{c7}$, | $Q_{c15} = -Q_{c7}$, |
| $I_{c16} = -I_{c8}$, and | $Q_{c16} = -Q_{c8}$, | wherein:
$I_r$=the averaged corrected in-phase reference signal, and
$Q_r$=the averaged corrected quadrature-phase reference signal.

9. The RFID reader of claim 1, wherein the decision module is configured to calculate M distance values according to:

$$\text{distance value }(n) = [(I - I_{cn})^2 + (Q - Q_{cn})^2]$$

wherein:
n=1 through M,
I=the in-phase signal component,
Q=the quadrature-phase signal component,
$I_{cn}$=an I coordinate of a corrected constellation point n, and
$Q_{cn}$=a Q coordinate of a corrected constellation point n;
wherein the closest point of the M corrected constellation points to the current data symbol is a point n having a minimum distance value (n) of the calculated M distance values.

10. The RFID reader of claim 1, wherein M=16.

11. A method in a radio frequency identification (RFID) reader of communicating with RFID tags, comprising:
demodulating a received quadrature modulated radio frequency signal to an in-phase signal component and a quadrature-phase signal component that contain a current data symbol;
determining a closest point of M previously generated corrected constellation points to the in-phase and the quadrature-phase signal components;
demapping the determined closest point to a data value for the current data symbol;
generating a corrected in-phase reference signal and a corrected quadrature-phase reference signal based on the determined closest point, the in-phase signal component, and the quadrature-phase signal component;
generating an averaged corrected in-phase reference signal and an averaged corrected quadrature-phase reference signal based on corrected in-phase reference signals and corrected quadrature-phase reference signals generated for S data symbols including the current data symbol; and
generating a corrected constellation having M corrected constellation points based on the averaged corrected in-phase reference signal and the averaged corrected quadrature-phase reference signal, wherein each of the M corrected constellation points is defined by an I coordinate and a Q coordinate.

12. The method of claim 11, wherein said generating a corrected in-phase reference signal and a corrected quadrature-phase reference signal comprises:
generating the corrected in-phase reference signal according to:

$$I_r = A_0(I \cos \Delta - Q \sin \Delta)/A; \text{ and}$$

generating the corrected quadrature-phase reference signal according to:

$$Q_r = A_0(Q \cos \Delta + I \sin \Delta)/A;$$

wherein:
I=the in-phase signal component,
Q=the quadrature-phase signal component,
$I_r$=the corrected in-phase reference signal for the current data symbol,
$Q_r$=the corrected quadrature-phase reference signal for the current data symbol,
Δ=a phase difference between the local reference signal and a vector formed by the determined closest point,
A=an amplitude of the vector, and
$A_0$=an amplitude of the local reference signal.

13. The method of claim 12, wherein said generating an averaged corrected in-phase reference signal and an averaged corrected quadrature-phase reference signal comprises:
generating the averaged corrected in-phase reference signal according to:

$$I_r(i) = \left(\frac{1}{S}\right) \sum_{j=i-S}^{i} I_{jr}; \text{ and}$$

generating the averaged corrected quadrature-phase reference signal according to:

$$Q_r(i) = \left(\frac{1}{S}\right) \sum_{j=i-S}^{i} Q_{jr};$$

wherein:
i=an index of the current data symbol,
j=an index of data symbols, where j<i for data symbols prior to the current data symbol, and j=i for the current data symbol,
$I_{jr}$=the corrected in-phase reference signal for the jth data symbol,
$Q_{jr}$=the corrected quadrature-phase reference signal for the jth data symbol,
$I_r(i)$=the averaged corrected in-phase reference signal for the current data symbol, and
$Q_r(i)$=the averaged corrected quadrature-phase reference signal for the current data symbol.

14. The method of claim 11, wherein said generating an averaged corrected in-phase reference signal and an averaged corrected quadrature-phase reference signal comprises calculating a sliding window average.

15. The method of claim 11, wherein said generating an averaged corrected in-phase reference signal and an averaged corrected quadrature-phase reference signal generating an average for each received block of S data symbols.

16. The method of claim 11, wherein M=16, wherein generating the corrected in-phase reference signal and the corrected quadrature-phase reference signal comprises:

generating the corrected in-phase reference signal ($I_{ir}$) and the corrected quadrature-phase reference signal ($Q_{ir}$), according to:

| | | |
|---|---|---|
| if i = 1, | $I_{1r} = (I + Q)/2$, and | $Q_{1r} = (Q - I)/2$, |
| if i = 2, | $I_{2r} = 0.3I + 0.1Q$, and | $Q_{2r} = 0.3Q - 0.1I$, |
| if i = 3, | $I_{3r} = (I + Q)/6$, and | $Q_{3r} = (Q - I)/6$, |
| if i = 4, | $I_{4r} = 0.1I + 0.3Q$, and | $Q_{4r} = 0.1Q - 0.3I$, |
| if i = 5, | $I_{5r} = (Q - I)/2$, and | $Q_{5r} = -(I + Q)/2$, |
| if i = 6, | $I_{6r} = 0.3Q - 0.1I$, and | $Q_{6r} = -0.3I - 0.1Q$, |
| if i = 7, | $I_{7r} = (Q - I)/6$, and | $Q_{7r} = -(I + Q)/6$, |
| if i = 8, | $I_{8r} = 0.1Q - 0.3I$, and | $Q_{8r} = -0.3Q - 0.1I$, |
| if i = 9, | $I_{9r} = -(I + Q)/2$, and | $Q_{9r} = (I - Q)/2$, |
| if i = 10, | $I_{10r} = -0.3I - 0.1Q$, and | $Q_{10r} = -0.3Q + 0.1I$, |
| if i = 11, | $I_{11r} = -(I + Q)/6$, and | $Q_{11r} = (I - Q)/6$, |
| if i = 12, | $I_{12r} = -0.1I - 0.3Q$, and | $Q_{12r} = -0.1Q + 0.3I$, |
| if i = 13, | $I_{13r} = (I - Q)/2$, and | $Q_{13r} = (I + Q)/2$, |
| if i = 14, | $I_{14r} = -0.3Q + 0.1I$, and | $Q_{14r} = 0.3I + 0.1Q$, |
| if i = 15, | $I_{15r} = (I - Q)/6$, and | $Q_{15r} = (I + Q)/6$, and |
| if i = 16, | $I_{16r} = -0.1Q + 0.3I$, and | $Q_{16r} = 0.3Q + 0.1I$, | wherein:
i=an index of the data value for the current data symbol,
I=the in-phase signal component, and
Q=the quadrature-phase signal component.

17. The method of claim 11, wherein M=16, wherein said generating a corrected constellation having M corrected constellation points comprises:

generating 16 corrected constellation points ($I_{c1}$-$I_{c16}$) according to:

| | |
|---|---|
| $I_{c1} = Ir - Qr$, | $Q_{c1} = Ir + Qr$, |
| $I_{c2} = 3Ir - Qr$, | $Q_{c2} = Ir + 3Qr$, |
| $I_{c3} = 3(Ir - Qr)$, | $Q_{c3} = 3(Ir + Qr)$, |
| $I_{c4} = Ir - 3Qr$, | $Q_{c4} = 3Ir + Qr$, |
| $I_{c5} = -Ir - Qr$, | $Q_{c5} = Ir - Qr$, |
| $I_{c6} = -Ir - 3Qr$, | $Q_{c6} = 3Ir - Qr$, |
| $I_{c7} = -3(Ir + Qr)$, | $Q_{c7} = 3(Ir - Qr)$, |
| $I_{c8} = -3Ir - Qr$, | $Q_{c8} = Ir - 3Qr$, |
| $I_{c9} = -I_{c1}$, | $Q_{c9} = -Q_{c1}$, |
| $I_{c10} = -I_{c2}$, | $Q_{c10} = -Q_{c2}$, |
| $I_{c11} = -I_{c3}$, | $Q_{c11} = -Q_{c3}$, |
| $I_{c12} = -I_{c4}$, | $Q_{c12} = -Q_{c4}$, |
| $I_{c13} = -I_{c5}$, | $Q_{c13} = -Q_{c5}$, |
| $I_{c14} = -I_{c6}$, | $Q_{c14} = -Q_{c6}$, |
| $I_{c15} = -I_{c7}$, | $Q_{c15} = -Q_{c7}$, |
| $I_{c16} = -I_{c8}$, and | $Q_{c16} = -Q_{c8}$, | wherein:
$I_r$=the averaged corrected in-phase reference signal, and
$Q_r$=the averaged corrected quadrature-phase reference signal.

18. The method of claim 11, wherein said determining the closest point comprises:

calculating M distance values according to:

$$\text{distance value }(n)=[(I-I_{cn})^2+(Q-Q_{cn})^2]$$

wherein:
n=1 through M,
I=the in-phase signal component,
Q=the quadrature-phase signal component,
$I_{cn}$=an I coordinate of a corrected constellation point n, and
$Q_{cn}$=a Q coordinate of a corrected constellation point n; and determining the minimum distance value of the calculated M distance values;
wherein the closest point is a point n corresponding to the determined minimum distance value (n) of the calculated M distance values.

19. A system in a radio frequency identification (RFID) reader of communicating with RFID tags, comprising:

means for demodulating a received quadrature modulated radio frequency signal to an in-phase signal component and a quadrature-phase signal component that contain a current data symbol;

means for determining a closest point of M previously generated corrected constellation points to the in-phase and the quadrature-phase signal components;

means for demapping the determined closest point to a data value for the current data symbol;

means for generating a corrected in-phase reference signal and a corrected quadrature-phase reference signal based on the determined closest point, the in-phase signal component, and the quadrature-phase signal component;

means for generating an averaged corrected in-phase reference signal and an averaged corrected quadrature-phase reference signal based on corrected in-phase reference signals and corrected quadrature-phase reference signals generated for S data symbols including the current data symbol; and means for generating a corrected constellation having M corrected constellation points based on the averaged corrected in-phase reference signal and the averaged corrected quadrature-phase reference signal, wherein each of the M corrected constellation points is defined by an I coordinate and a Q coordinate.

* * * * *

UNITED STATES PATENT AND TRADEMARK OFFICE
CERTIFICATE OF CORRECTION

PATENT NO. : 7,787,568 B2  
APPLICATION NO. : 11/472453  
DATED : August 31, 2010  
INVENTOR(S) : Okunev Page 1 of 1

It is certified that error appears in the above-identified patent and that said Letters Patent is hereby corrected as shown below:

In Column 9, Line 26, delete "symbol" and insert -- symbol. --, therefor.

In Column 16, Line 48, delete "A0" and insert -- $A_0$ --, therefor.

In Column 20, Line 13, in Claim 4, delete "configured generate" and insert -- configured to generate --, therefor.

In Column 20, Line 21, in Claim 4, delete "configured generate" and insert -- configured to generate --, therefor.

In Column 20, Line 52, in Claim 7, delete "configured generate" and insert -- configured to generate --, therefor.

Signed and Sealed this  
Fourteenth Day of August, 2012

David J. Kappos  
*Director of the United States Patent and Trademark Office*